US012547498B2

(12) United States Patent
Samuel et al.

(10) Patent No.: US 12,547,498 B2
(45) Date of Patent: Feb. 10, 2026

(54) POWER RECOVERY IN A NON-BOOTING INFORMATION HANDLING SYSTEM

(71) Applicant: Dell Products L.P., Round Rock, TX (US)

(72) Inventors: Balasingh P. Samuel, Round Rock, TX (US); Adolfo S. Montero, Pflugerville, TX (US); Michael Wayne Arms, Copperas Cove, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/341,433

(22) Filed: Jun. 26, 2023

(65) Prior Publication Data

US 2024/0427668 A1 Dec. 26, 2024

(51) Int. Cl.
| | |
|---|---|
| *G06F 11/14* | (2006.01) |
| *G06F 1/30* | (2006.01) |
| *G06F 11/07* | (2006.01) |
| *G06F 1/14* | (2006.01) |
| *G06F 1/24* | (2006.01) |

(52) U.S. Cl.
CPC ............ *G06F 11/1441* (2013.01); *G06F 1/30* (2013.01); *G06F 11/0757* (2013.01); *G06F 11/1417* (2013.01); *G06F 1/14* (2013.01); *G06F 1/24* (2013.01); *G06F 2201/86* (2013.01)

(58) Field of Classification Search
CPC ............ G06F 11/1441; G06F 11/0757; G06F 11/1417; G06F 1/14; G06F 1/24; G06F 2201/86; G06F 1/30
See application file for complete search history.

(56) References Cited

U.S. PATENT DOCUMENTS

| | | | |
|---|---|---|---|
| 10,067,834 B1* | 9/2018 | Montero | G06F 11/1417 |
| 2018/0059752 A1* | 3/2018 | Khatri | G06F 1/24 |
| 2018/0121277 A1* | 5/2018 | Dougherty | G06F 11/0793 |
| 2020/0159302 A1* | 5/2020 | Chaiken | G06F 1/24 |
| 2024/0118966 A1* | 4/2024 | Sayyed | G06F 11/0793 |
| 2024/0220367 A1* | 7/2024 | Hiremath | G06F 11/14 |

\* cited by examiner

*Primary Examiner* — Marc Duncan
*Assistant Examiner* — Michael Xu
(74) *Attorney, Agent, or Firm* — Norton Rose Fulbright US LLP

(57) ABSTRACT

Aspects of this disclosure implement a power recovery method without user intervention to drain all power rails of a non-booting information handling system and restoring power after a full drain sequence has been completed. A method may include determining, by a management circuit, a failure occurs preventing handoff from a basic input/output system (BIOS) to an operating system; based on determining the failure occurs: disconnecting, by the management circuit of the information handling system, one or more active power sources and one or more real-time clock (RTC) power sources; and after a predetermined delay following disconnecting: re-connecting, by the management circuit of the information handling system, the at least one of the one or more active power sources or the one or more real-time clock (RTC) power sources; and booting the information handling system. Other aspects are also disclosed.

12 Claims, 8 Drawing Sheets

POWER RECOVERY IN A NON-BOOTING INFORMATION HANDLING SYSTEM

FIELD OF THE DISCLOSURE

The instant disclosure relates to information handling systems. More specifically, portions of this disclosure relate to draining power rails of an information handling system without user intervention to recover a non-booting system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system fails to boot, a user or technical professional has to remove all power sources and ensure that the power rails have fully drained to recover the system. To ensure that the information handling system has been fully powered off, this typically requires disassembling the system in order to disconnect inaccessible internal batteries.

SUMMARY

Aspects of this disclosure implement a power recovery method without user intervention to drain all power rails of a non-booting information handling system and restoring power after a full drain sequence has been completed. The method may be executed by a management circuit which may comprise an embedded controller of the information handling system or be a dedicated and/or custom logic circuit so that the embedded controller's power source may also be drained. This recovery method automates the power flush process and saves costs for the customer and manufacturer, while reducing customer productivity interruption and frustration.

Various other no-boot scenarios may be corrected with, for example, a power button or automatic RTC reset. However, this only removes the RTC power rail from the platform controller hub (PCH) by toggling the RTC reset signal to the PCH but does not perform a full system power removal and recovery.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, the method comprises determining, by a management circuit of an information handling system, a failure occurs preventing handoff from a basic input/output system (BIOS) to an operating system; based on determining the failure occurs: disconnecting, by the management circuit of the information handling system, one or more active power sources supplying a core voltage supply; disconnecting, by the management circuit of the information handling system, one or more real-time clock (RTC) power sources; and after a predetermined delay following disconnecting at least one of the one or more active power sources or the one or more real-time clock (RTC) power sources: re-connecting, by the management circuit of the information handling system, the at least one of the one or more active power sources or the one or more real-time clock (RTC) power sources; and booting the information handling system.

In certain embodiments, the disconnecting the one or more active power sources comprises commanding a battery management unit of the information handling system to enter a storage mode to disconnect a battery of the information handling system.

In certain embodiments, the disconnecting the one or more active power sources and the disconnecting the one or more RTC power sources removes power from all power rails of the information handling system except for the management circuit of the information handling system.

According to another embodiment, the management circuit comprises an embedded controller (EC).

In some embodiments, the information handling system comprises an embedded controller (EC), and wherein the disconnecting the one or more RTC power sources comprises disconnecting a power source of the EC.

In certain embodiments, determining the failure occurs is based, at least in part, on a watchdog timer expiring before the handoff from BIOS to the operating system.

According to another embodiment, the watchdog timer starts with unified extensible firmware interface (UEFI) pre-boot phase initialization.

In certain embodiments, the predetermined delay is a time long enough to reduce the core voltage supply to an inoperable state.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Aspects of the disclosure include apparatuses, configurations, and/or methods for executing a power flush sequence for an information handling system. In one embodiment of the disclosure, the power flush sequence comprises disconnecting one or more active power sources supplying a core voltage supply and/or one or more real-time clock (RTC) power sources and reconnecting the at least one of the one or more active power sources or the one or more real-time clock (RTC) power sources after enough time to ensure the power sources were drained to an inoperable state.

Figure 1:
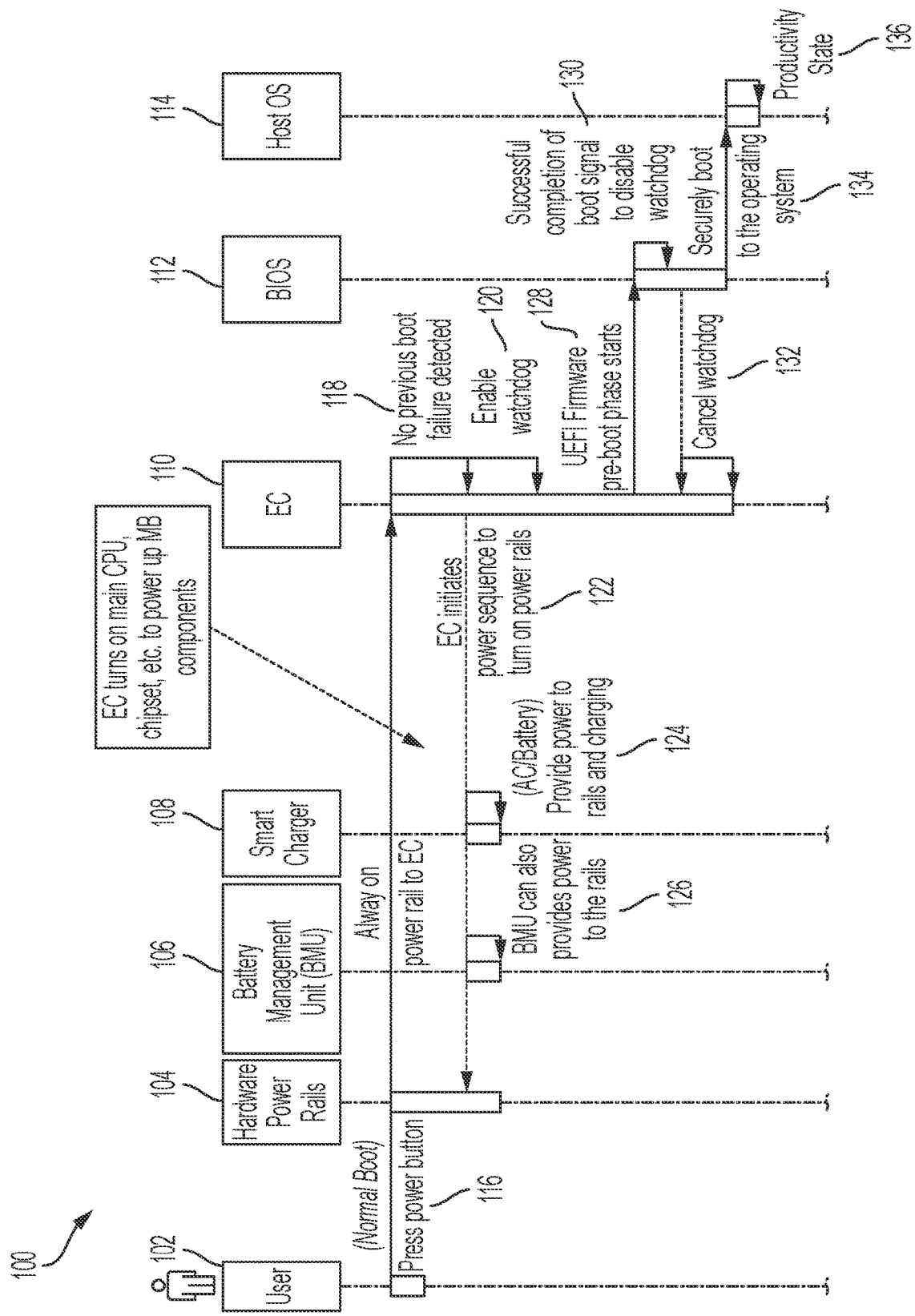
FIG. 1 is a call flow diagram illustrating a healthy booting of an information handling system according to certain embodiments of the disclosure.

FIG. 1 illustrates a healthy booting of an information handling system according to certain embodiments of the disclosure. Referring to FIG. 1, the user 102 may attempt to turn on an information handling system by pressing a power button. The hardware power rails 104 communicate to the embedded controller (EC) 110 using the always on power rail. When the EC detects no previous boot failure 118, it communicates with the hardware power rails 104 to initiate the power sequence to turn on power rails 122. The AC or battery, such as through a smart charger circuit 108 that managed delivery of power from an external source to an internal battery and from an external source to components of the information handling system, powering the system provides power to the rails and begins charging the system battery 124. The battery management unit (BMU) 106 (or Battery Management System (BMS)), which may be a system for monitoring and/or controlling an output of a battery, can also provide power 126 to the hardware power rails 104. The EC further enables the watchdog timer 120 for the successful boot signal. The unified extensible firmware interface (UEFI) pre-boot phase begins 128 at the start of the watchdog timer. Upon successful completion of boot signal to disable the watchdog timer 130, the EC 110 cancels the watchdog timer 132 and the BIOS 112 securely boots to the operating system 134. The host OS 114 proceeds to operate in the productivity state 136 to proceed with user operations.

Figure 2:
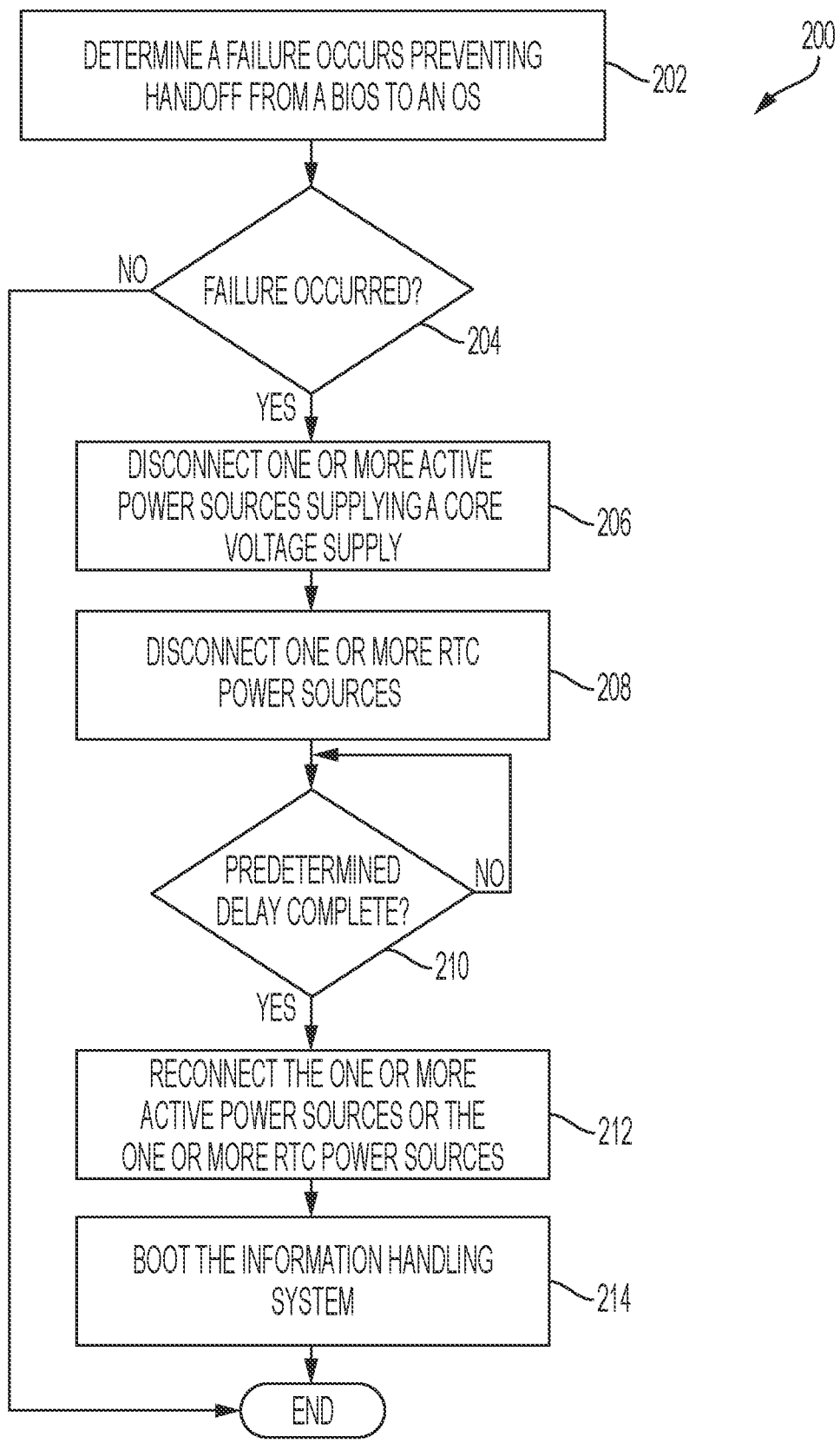
FIG. 2 is a flowchart illustrating a method of disconnecting and reconnecting power sources of an information handling system upon determining a failure to boot according to certain embodiments of the disclosure.

FIG. 2 illustrates a method of disconnecting and reconnecting power sources of an information handling system upon determining a failure to boot according to certain embodiments of the disclosure. Referring to FIG. 2, method 200 discloses determining a failure occurring which prevents handoff from a BIOS to an OS. This determination may be based, at least in part, on a watchdog timer set by an embedded controller of the information handling system. The watchdog timer may also be set by a management circuit of the information handling system according to certain embodiments of the disclosure. The watchdog timer starts with the UEFI pre-boot phase initialization as the OS awaits the boot signal from BIOS. At step 204, the method determines that a boot failure has occurred and proceeds to step 206 to disconnect one or more active power sources supplying a core voltage supply. The core voltage supply may comprise all non-RTC power supply voltages, such as supply voltages for processor cores, displays, and/or peripherals of the information handling system. The EC may also send an I2C message to the battery management unit to disconnect a battery of the information handling system. According to some embodiments, the battery management unit may be commanded to enter a storage mode to disconnect the battery. At step 208, the EC sends a signal to disconnect one or more RTC power sources. This method may utilize GPIO to disconnect the one more RTC power rails according to certain embodiments of the disclosure. A timer may be initiated at the disconnecting of either the one or more active power sources, the one or more RTC power sources, or the disconnecting of both. The disconnecting of the one or more power sources and the disconnecting of the one or more RTC power sources removes power from all power rails of the information handling system except for the management circuit of the information handling system. The timer may be set as a predetermined delay for the draining of the various power sources for the duration of such a power flush sequence. If the predetermined time delay is determined to be complete at step 210, the method proceeds to reconnect the one or more active power sources and/or the one or more RTC power sources at step 212. After the power flush sequence of disconnecting, draining, and reconnecting the power sources of the information handling system, the system is rebooted at step 214.

Figure 3:
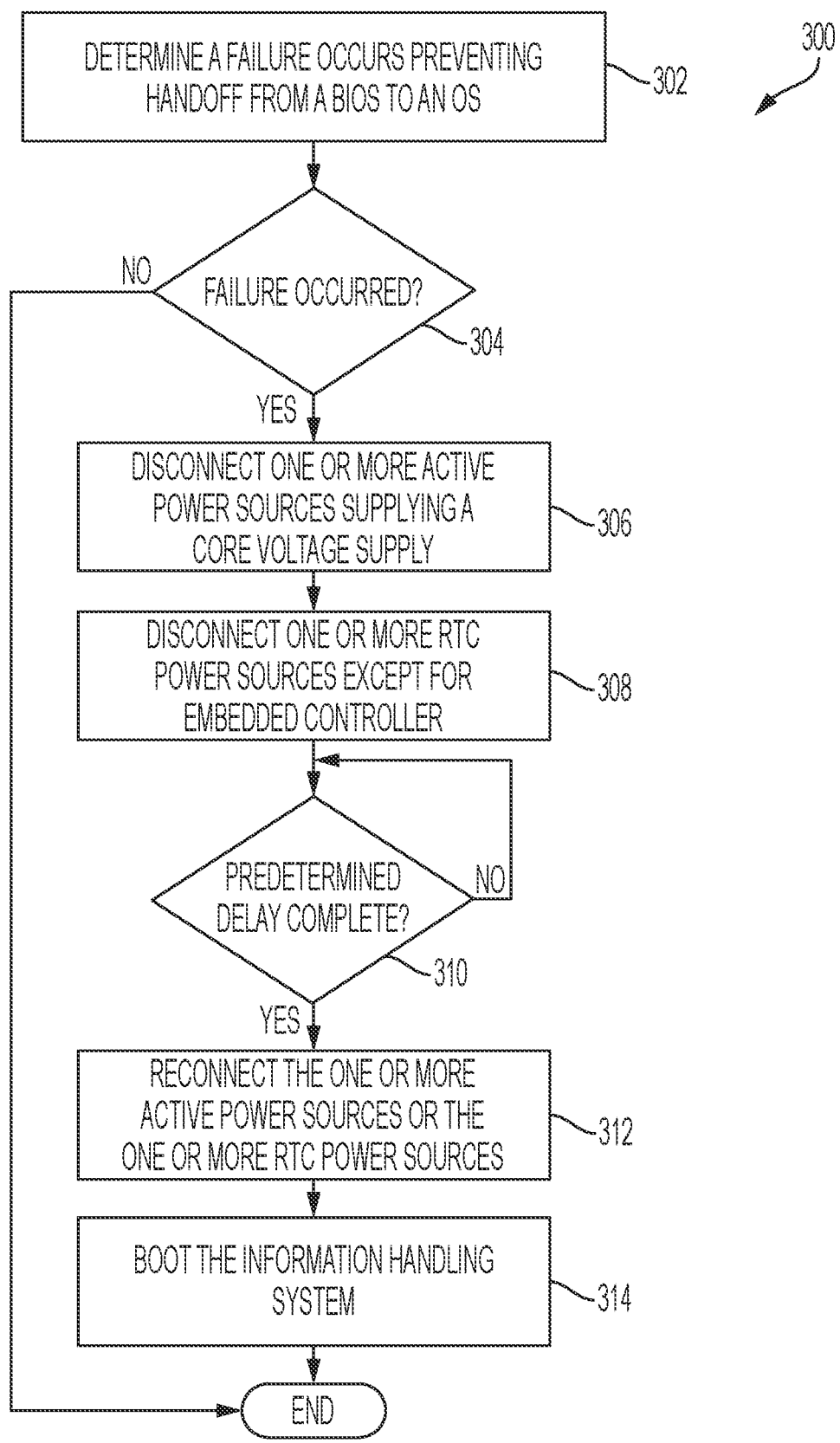
FIG. 3 is a flowchart illustrating a method of disconnecting and reconnecting power sources of an information handling system upon determining a failure to boot according to certain embodiments of the disclosure.

FIG. 3 illustrates a method of disconnecting and reconnecting power sources of an information handling system upon determining a failure to boot according to certain embodiments of the disclosure. Similar to method 200 of FIG. 2, FIG. 3 describes method 300 of determining a failure to boot the information handling system during the handoff of BIOS to the OS at step 302. However, method 300 specifies a management circuit comprising an embedded controller of the information handling system according to certain embodiments. Referring to FIG. 3, the disconnecting of one or more RTC power sources excludes the embedded controller, which performs the functionality of the management circuit as further illustrated in FIGS. 4A and 4B.

Figure 4A:
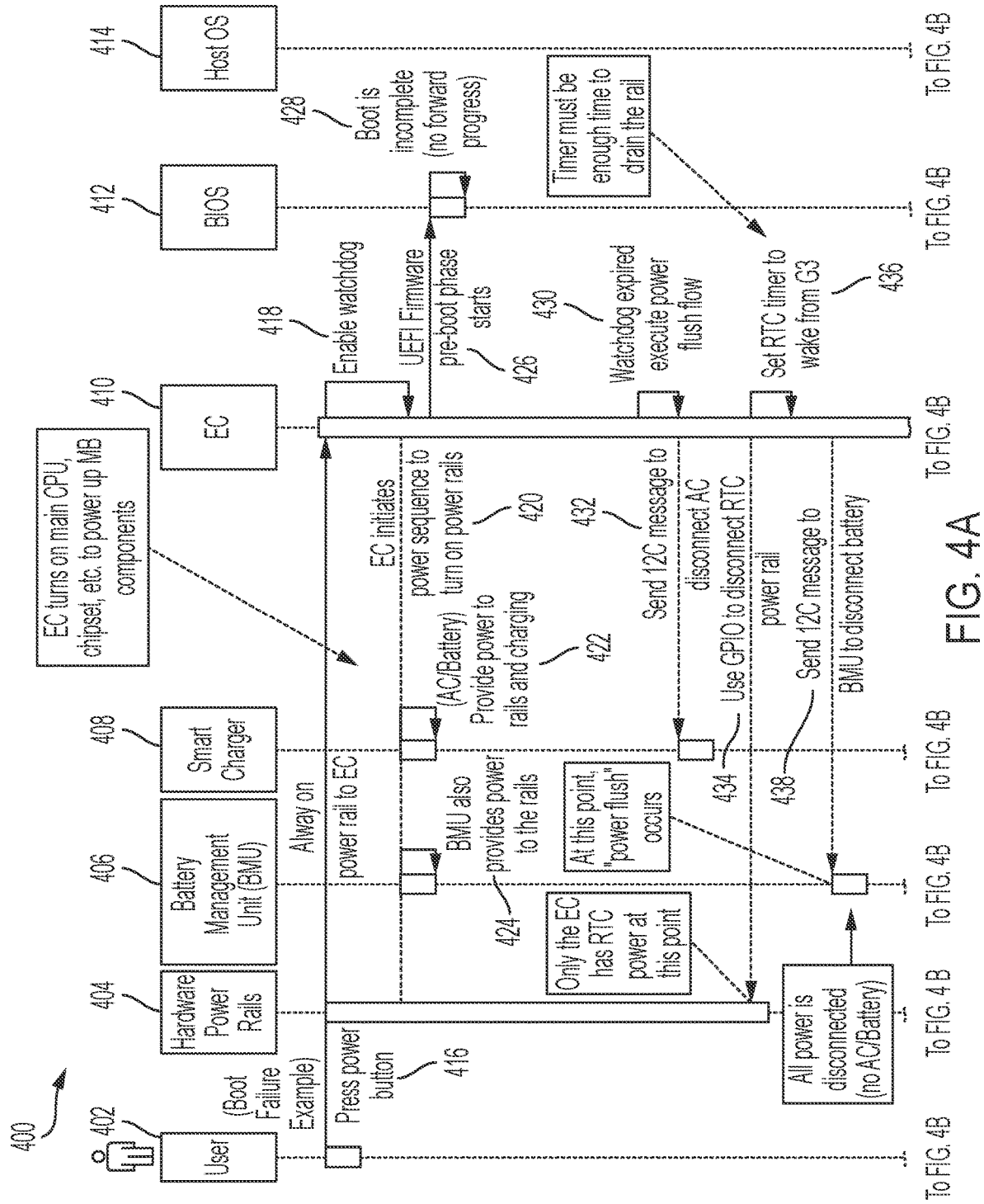
FIGS. 4A and 4B are a call flow diagram illustrating the method of disconnecting and reconnecting power sources of an information handling system upon determining a failure to boot according to certain embodiments of the disclosure.
Figure 4B:
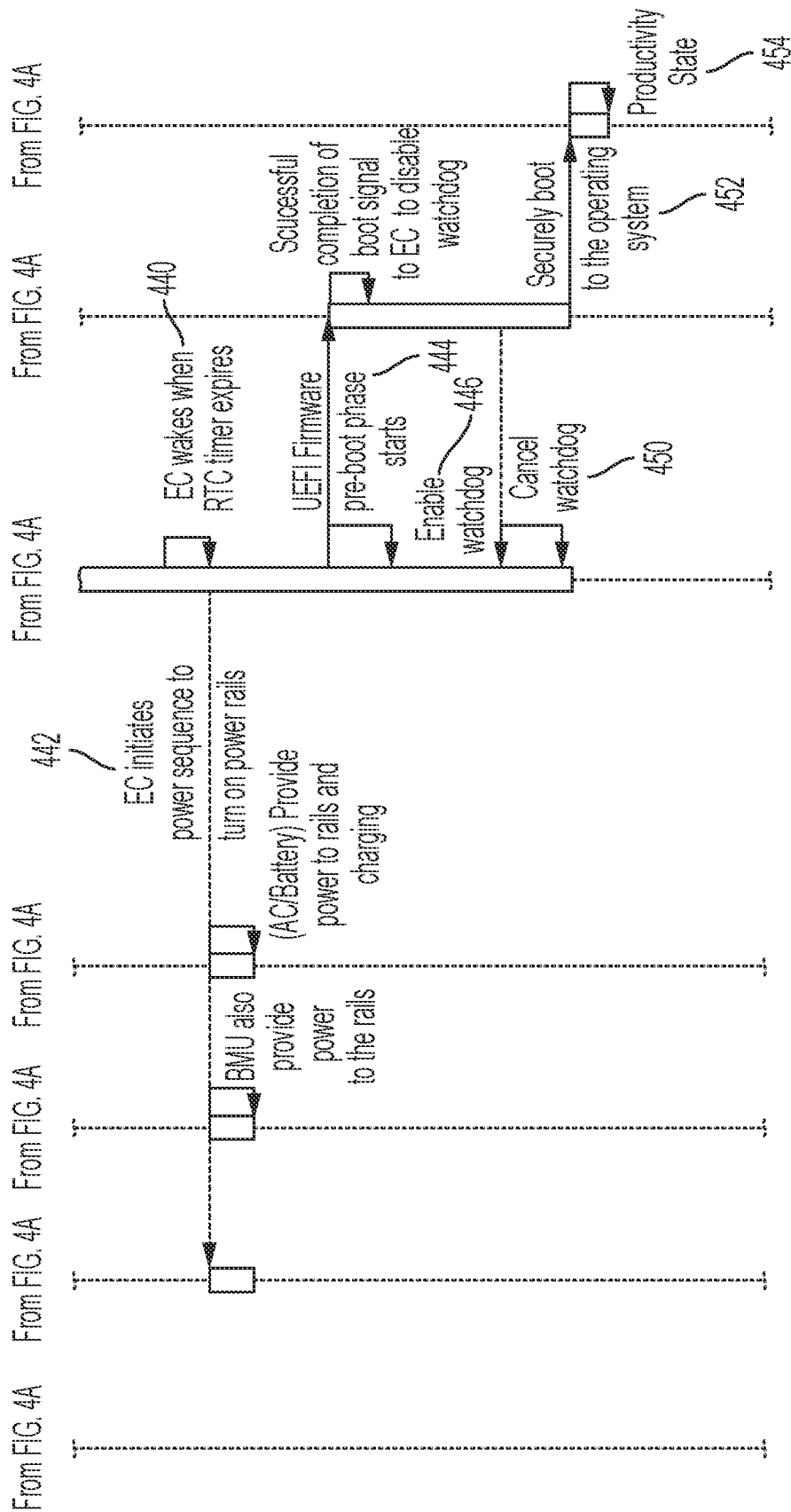

FIGS. 4A and 4B illustrate the methods of disconnecting and reconnecting power sources of an information handling system upon determining a failure to boot according to certain embodiments of the disclosure. Call flow diagram 400 illustrates the boot flow of the embedded controller during a power flush sequence, wherein all power is disconnected and waits for a predetermined time delay before reconnecting power and booting the information handling system. The user 402 of the information handling system may press a power button 416 to turn on the system, which comprises the hardware power rails 404 communicating to the EC 410 to enable the watchdog timer 418. Initiating a boot sequence, the EC 410 will attempt to turn on power rails 420 by communicating with a charger 408 to provide AC or battery power to the power rails, begin charging the system, and also instruct the BMU 406 to provide power to the rails 424. At the start of the watchdog timer, the UEFI pre-boot phase starts 426. When the watchdog timer expires 430 before the handoff from BIOS 412 to the OS 414, the EC 410 determines that the boot was incomplete 428 and activates the code flow designated to the failed boot handler. The EC 410 sends an I2C message to the charger 408 to disconnect the AC power supply 432 programmatically. This may be done by making the charger 408 enter battery learning mode to force the battery to discharge regardless of whether it is connected to AC power. The EC 410 may also use an existing RTC reset circuit GPIO to disconnect one or more RTC power rails from a plurality system components 434 excluding the EC 410. The EC 410 will also set an RTC timer 436 for a predetermined period of time as a predetermined delay for at least a time long enough to ensure the power rails have time to fully drain. The EC 410 then sends an I2C message to the BMU 406 to disconnect the battery. The battery is forced to disconnect as the EC 410 commands the BMU 406 to enter a storage mode, resulting in the BMU 406 disconnecting both output FETs internal to the battery. This emulates the physical removal of the primary battery.

The EC 410 waits until the predetermined delay is complete, and once the RTC timer expires 440, the EC 410 initiates a power sequence to turn on all power rails 442, including AC/battery to provide power to rails and charging and the BMU 406 to also provide power to the rails. The EC's watchdog timer 446 restarts, beginning with the UEFI pre-boot phase initialization 444. If the boot fails again, the system may restart the power flush sequence and retry the same process. The EC may use a non-volatile counter that is used to prevent an infinite loop of retries for full power removal that is read prior to restarting the power flush sequence. This counter may be predetermined, such as configured by a system policy. Once the boot signal from BIOS 412 is received by the EC 410, the watchdog timer is disabled 450 and the system securely boots to the operating system 452. The host OS 414 proceeds to operate in the productivity state 454.

Figure 5:
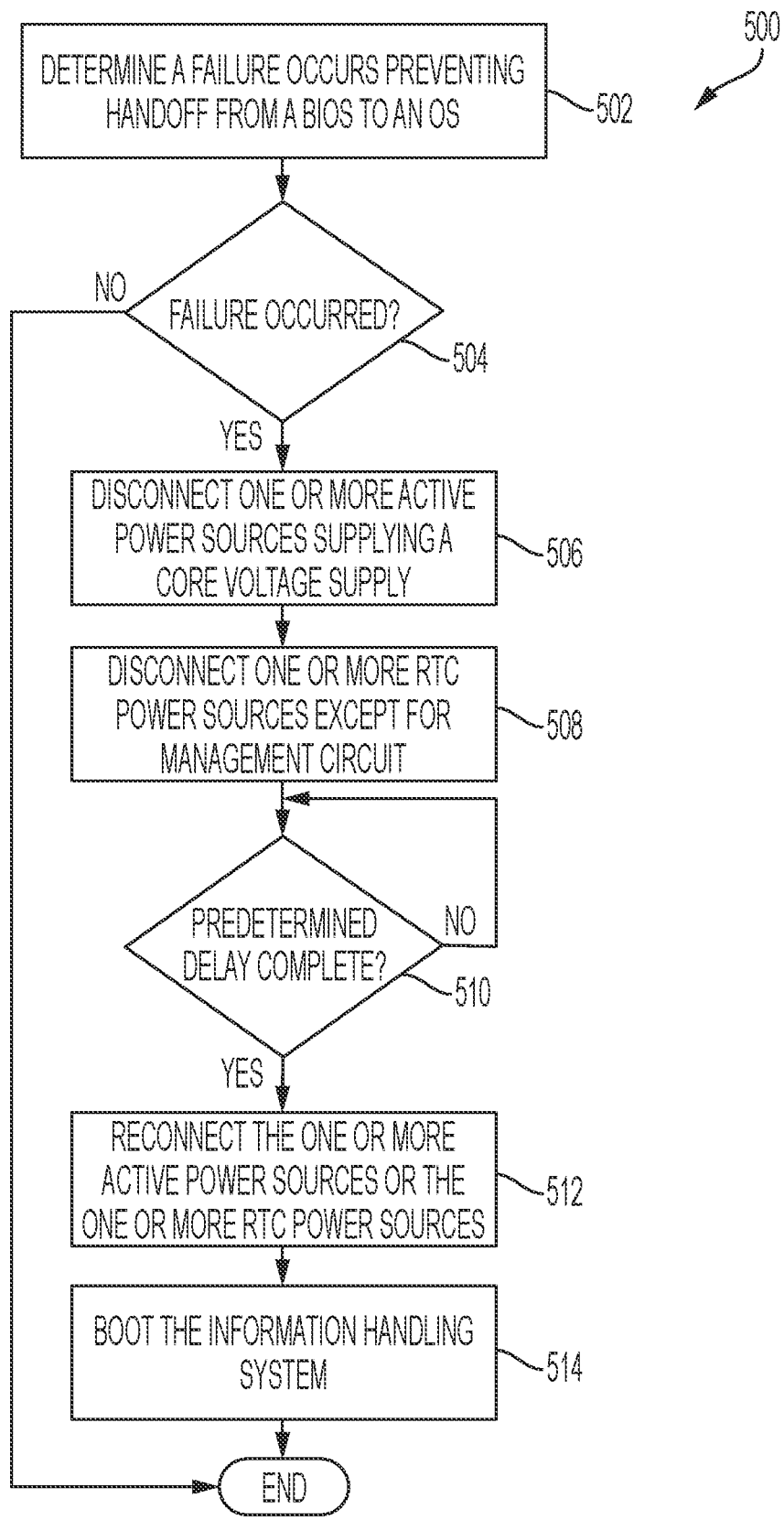
FIG. 5 is a flowchart illustrating a method of disconnecting and reconnecting power sources of an information handling system upon determining a failure to boot according to certain embodiments of the disclosure.

FIG. 5 is a flowchart illustrating a method of disconnecting and reconnecting power sources of an information handling system upon determining a failure to boot according to certain embodiments of the disclosure. Similar to methods 200 and 300 of FIG. 2 and FIG. 3, respectively, method 500 of FIG. 5 describes determining a failure to boot the information handling system during the handoff of BIOS to the OS at step 502. However, method 500 specifies a management circuit separate an embedded controller of the information handling system according to certain embodiments of the disclosure. Referring to FIG. 5, the disconnecting of one or more RTC power sources includes the embedded controller but excludes a management circuit, wherein the management circuit performs the functionality of disconnecting and reconnecting power sources of an information handling system.

Figure 6:
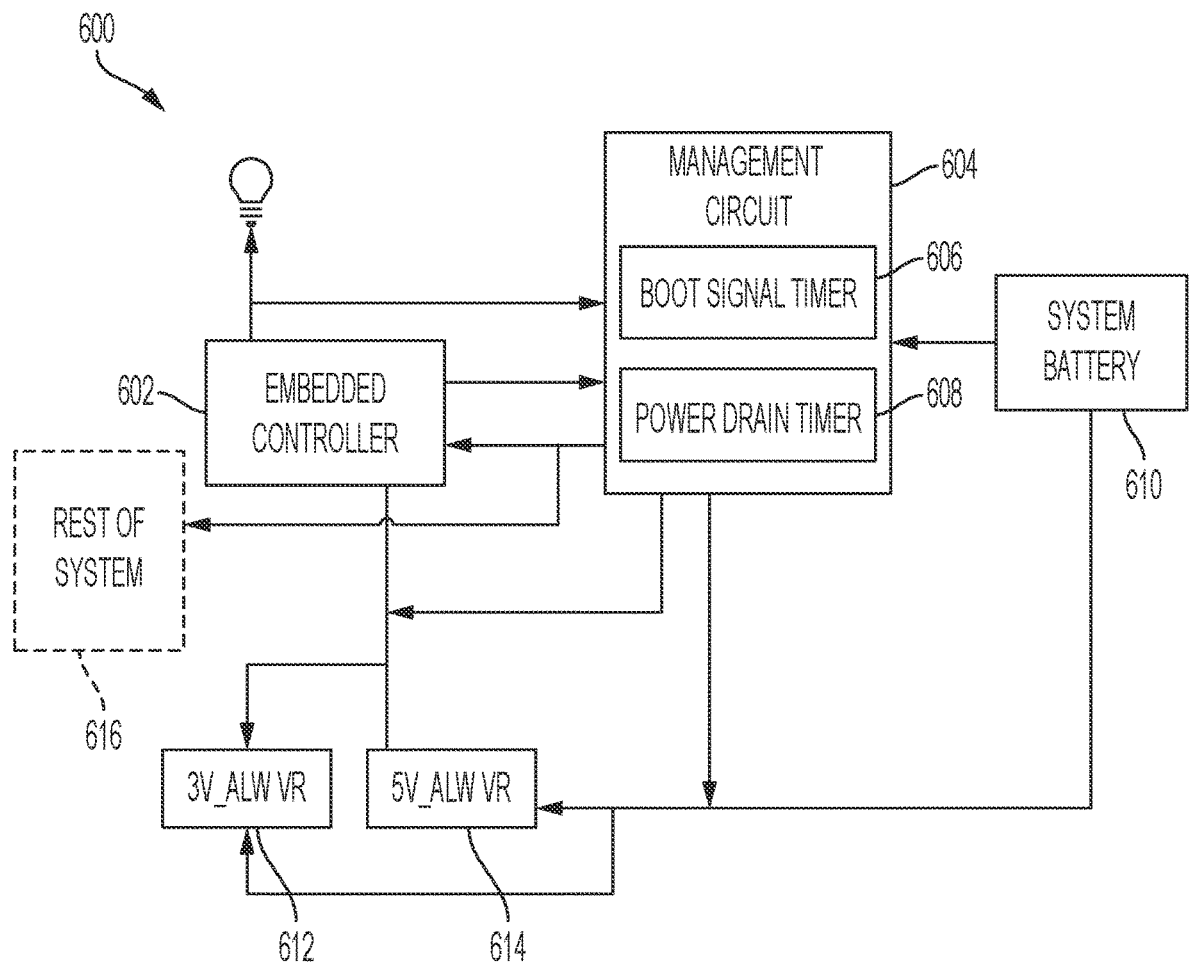
FIG. 6 is a block diagram illustrating communications between the management circuit and embedded controller with the rest of the information handling system according to certain embodiments of the disclosure.

FIG. 6 is a block diagram illustrating communications between the management circuit and embedded controller with the rest of the information handling system according to certain embodiments of the disclosure. A method, such as method 500, may implement the recovery of a non-booting system according to certain embodiments of the disclosure using a management circuit. Referring to FIG. 6, management circuit 604 assumes the functionality of the boot signal timer 606 and the power drain timer 608, which are otherwise the responsibility of the EC. The management circuit may operate on a second RTC power rail that supersedes the EC RTC power rail in power distribution topology. The management circuit 604 may monitor the EC failure LED indicator GPIO for timing exceeding a predetermined normal EC boot time. The management circuit 604 may receive input from the EC 602 when EC 602 wants to trigger a full power flush, including its own RTC power rail. The management circuit 604 will be able to cut off all power rails excluding its own and use the power drain timer 608 to ensure all power rails fully drain. According to some embodiments, the management circuit 604 may include a MOSFET to purposely short the power rails when the power sources are disconnected to drain all of the capacitors on the motherboard. The management circuit 604 drains power from the voltage rails 612, 614 and disconnects the system battery 610. Upon completion of the predetermined timer delay, the management circuit 604 restores power to the rest of the information handling system. The management circuit 604 may include an option to limit the number of reboot attempts comprising the power flush sequence and may further control LEDs for error indication if the power flush sequence has exceeded a predetermined number of retries and is unable to recover the information handling system.

The circuitry and methods described above may be included in an information handling system to provide for detection of no-boot scenarios and execution of subsequent operations to recover the information handling system. The recovery may improve a user experience with the information handling system and improve the operation of the information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 7.

Figure 7:
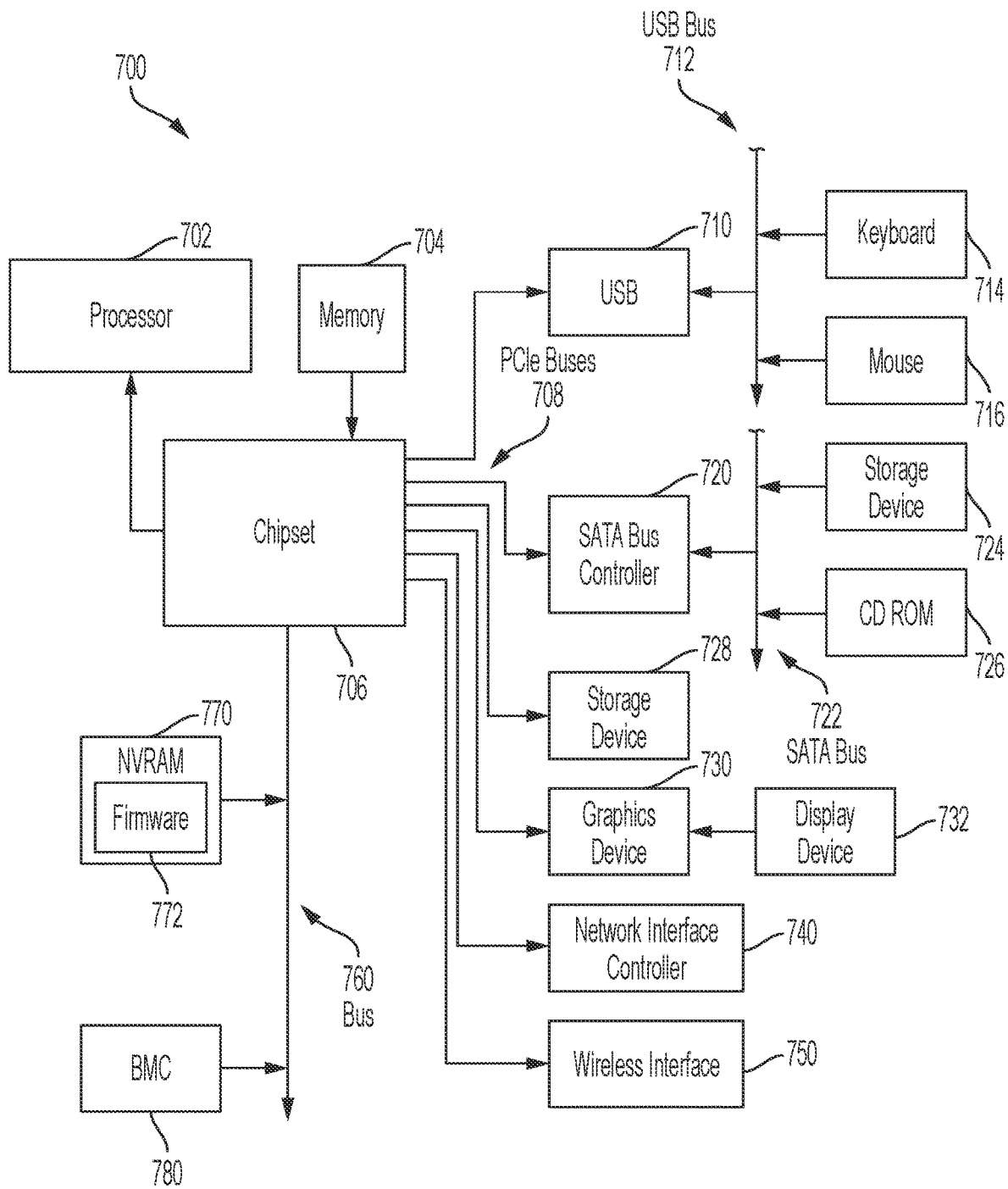
FIG. 7 is a schematic block diagram of an example information handling system according to some embodiments of the disclosure.

FIG. 7 illustrates an example information handling system 700. Information handling system 700 may include a processor 702 (e.g., a central processing unit (CPU)), a memory (e.g., a dynamic random-access memory (DRAM)) 704, and a chipset 706. In some embodiments, one or more of the processor 702, the memory 704, and the chipset 706 may be included on a motherboard (also referred to as a mainboard), which is a printed circuit board (PCB) with embedded conductors organized as transmission lines between the processor 702, the memory 704, the chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 702, the memory 704, the chipset 706, and/or other components may be organized as a System on Chip (SoC).

The processor 702 may execute program code by accessing instructions loaded into memory 704 from a storage device, executing the instructions to operate on data also loaded into memory 704 from a storage device, and generate output data that is stored back into memory 704 or sent to another component. The processor 702 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 702 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 706 may facilitate the transfer of data between the processor 702, the memory 704, and other components. In some embodiments, chipset 706 may include two or more integrated circuits (ICs), such as a northbridge controller coupled to the processor 702, the memory 704, and a southbridge controller, with the southbridge controller coupled to the other components such as USB 710, SATA 720, and PCIe buses 708. The chipset 706 may couple to other components through one or more PCIe buses 708.

Some components may be coupled to one bus line of the PCIe buses 708, whereas some components may be coupled to more than one bus line of the PCIe buses 708. One example component is a universal serial bus (USB) controller 710, which interfaces the chipset 706 to a USB bus 712. A USB bus 712 may couple input/output components such as a keyboard 714 and a mouse 716, but also other components such as USB flash drives, or another information handling system. Another example component is a SATA bus controller 720, which couples the chipset 706 to a SATA bus 722. The SATA bus 722 may facilitate efficient transfer of data between the chipset 706 and components coupled to the chipset 706 and a storage device 724 (e.g., a hard disk drive (HDD) or solid-state disk drive (SDD)) and/or a compact disc read-only memory (CD-ROM) 726. The PCIe bus 708 may also couple the chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 706 may also be coupled to a serial peripheral interface (SPI) and/or Inter-Integrated Circuit (I2C) bus 760, which couples the chipset 706 to system management components. For example, a non-volatile random-access memory (NVRAM) 770 for storing firmware 772 may be coupled to the bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

System 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of system 700.

Firmware 772 may include instructions executable by processor 102 to initialize and test the hardware components of system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of system 700 may be configured and enabled for operation and device drivers may be installed. Device drivers may provide an interface through which other components of the system 700 can communicate with a corresponding device. The firmware 772 may include a basic input-output system (BIOS) and/or include a unified extensible firmware interface (UEFI). Firmware 772 may also include one or more firmware modules of the information handling system. Additionally, configuration settings for the firmware 772 and firmware of the information handling system 700 may be stored in the NVRAM 770. NVRAM 770 may, for example, be a non-volatile firmware memory of the information handling system 700 and may store a firmware memory map namespace 700 of the information handling system. NVRAM 770 may further store one or more container-specific firmware memory map namespaces for one or more containers concurrently executed by the information handling system.

Information handling system 700 may include additional components and additional busses, not shown for clarity. For example, system 700 may include multiple processor cores (either within processor 702 or separately coupled to the chipset 706 or through the PCIe buses 708), audio devices (such as may be coupled to the chipset 706 through one of the PCIe busses 708), or the like. While a particular arrangement of bus technologies and interconnections is illustrated for the purpose of example, one of skill will appreciate that the techniques disclosed herein are applicable to other system architectures. System 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, the information handling system 700 may include a server comprising multiple processors for parallel processing. In some embodiments, the information handling system 700 may support virtual machine (VM) operation, with multiple virtualized instances of one or more operating systems executed in parallel by the information handling system 700. For example, resources, such as processors or processing cores of the information handling system may be assigned to multiple containerized instances of one or more operating systems of the information handling system 700 executed in parallel. A container may, for example, be a virtual machine executed by the information handling system 700 for execution of an instance of an operating system by the information handling system 700. Thus, for example, multiple users may remotely connect to the information handling system 700, such as in a cloud computing configuration, to utilize resources of the information handling system 700, such as memory, processors, and other hardware, firmware, and software capabilities of the information handling system 700. Parallel execution of multiple containers by the information handling system 700 may allow the information handling system 700 to execute tasks for multiple users in parallel secure virtual environments.

The schematic flow chart diagrams of FIGS. 2, 3, and 5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Certain elements of embodiments described in this specification have been labeled as modules. A module may include a component of that information handling system suitably programmed to operate according to executable instructions. For example, a module may be implemented as a hardware circuit comprising custom VLSI circuits or gate arrays, semiconductor chips comprising logic circuitry, transistors, or other discrete components. A module may also be implemented in programmable hardware devices such as field programmable gate arrays, programmable array logic, programmable logic devices, a controller, or the like.

Modules may also include software-defined units or instructions that, when executed by a component of an information handling system, retrieve and transform data stored on a data storage device from a first state to a second state. An identified module of executable code may, for example, comprise one or more physical blocks of computer instructions which may be organized as an object, procedure, or function. The executables of an identified module need not be physically located together, but may comprise disparate instructions stored in different locations which, when joined logically together, comprise the module, and when executed by the processor, achieve the stated data transformation.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    determining, by a management circuit of an information handling system, a failure occurs preventing handoff from a basic input/output system (BIOS) to an operating system;
    based on determining the failure occurs:
        receiving, by the management circuit of the information handling system, input from an embedded controller of the information handling system separate from the management circuit, the input indicating a power flush sequence;
        disconnecting, by the management circuit of the information handling system in response to the input, one or more active power sources supplying a core voltage supply, wherein the disconnecting the one or more active power sources comprises commanding a battery management unit of the information handling system to enter a storage mode to disconnect a battery of the information handling system;
        disconnecting, by the management circuit of the information handling system in response to the input, one or more real-time clock (RTC) power sources including a first RTC power source of the embedded controller but not a second RTC power source of the management circuit; and
        after a predetermined delay following disconnecting at least one of the one or more active power sources or the one or more real-time clock (RTC) power sources:
            re-connecting, by the management circuit of the information handling system, the at least one of the one or more active power sources or the one or more real-time clock (RTC) power sources; and
            booting the information handling system.

2. The method of claim 1, wherein the disconnecting the one or more active power sources and the disconnecting the one or more RTC power sources removes power from all components of the information handling system except for the management circuit of the information handling system.

3. The method of claim 1, wherein determining the failure occurs is based, at least in part, on a watchdog timer expiring before the handoff from BIOS to the operating system.

4. The method of claim 3, wherein the watchdog timer starts with unified extensible firmware interface (UEFI) pre-boot phase initialization.

5. The method of claim 1, wherein the predetermined delay is a time sufficient to reduce the core voltage supply to an inoperable state.

6. An information handling system, comprising:
    a memory;
    a processor coupled to the memory, wherein the processor is configured to perform steps comprising:

determining a failure occurs preventing handoff from a basic input/output system (BIOS) to an operating system;

based on determining the failure occurs:

receiving input from an embedded controller of the information handling system, the input indicating a power flush sequence;

disconnecting, in response to the input, one or more active power sources supplying a core voltage supply, wherein the disconnecting the one or more active power sources comprises commanding a battery management unit of the information handling system to enter a storage mode to disconnect a battery of the information handling system;

disconnecting, in response to the input, one or more real-time clock (RTC) power sources including a first RTC power source of the embedded controller but not a second RTC power source of a management circuit of the information handling system; and after a predetermined delay following disconnecting at least one of the one or more active power sources or the one or more real-time clock (RTC) power sources:

re-connecting the at least one of the one or more active power sources or the one or more real-time clock (RTC) power sources; and booting the information handling system.

7. The information handling system of claim 6, wherein the disconnecting the one or more active power sources and the disconnecting the one or more RTC power sources removes power from all components of the information handling system except for the management circuit of the information handling system.

8. The information handling system of claim 6, wherein determining the failure occurs is based, at least in part, on a watchdog timer expiring before the handoff from BIOS to the operating system.

9. The information handling system of claim 8, wherein the watchdog timer starts with unified extensible firmware interface (UEFI) pre-boot phase initialization.

10. The information handling system of claim 6, wherein the predetermined delay is a time long enough to reduce the core voltage supply to an inoperable state.

11. A computer program product, comprising:

a non-transitory computer readable medium comprising code that when executed by a processor of an information handling system performs steps comprising:

determining a failure occurs preventing handoff from a basic input/output system (BIOS) to an operating system;

based on determining the failure occurs:

receiving input from an embedded controller of the information handling system, the input indicating a power flush sequence;

disconnecting, in response to the input, one or more active power sources supplying a core voltage supply, wherein the disconnecting the one or more active power sources comprises commanding a battery management unit of the information handling system to enter a storage mode to disconnect a battery of the information handling system;

disconnecting, in response to the input, one or more real-time clock (RTC) power sources including a first RTC power source of the embedded controller but not a second RTC power source of a management circuit of the information handling system; and after a predetermined delay following disconnecting at least one of the one or more active power sources or the one or more real-time clock (RTC) power sources:

re-connecting the at least one of the one or more active power sources or the one or more real-time clock (RTC) power sources; and booting the information handling system.

12. The computer program product of claim 11, wherein the disconnecting the one or more active power sources and the disconnecting the one or more RTC power sources removes power from all components of the information handling system except for the management circuit of the information handling system.

* * * * *